March 26, 1946.   L. T. BARNES   2,397,308
METHOD OF MAKING PISTON RINGS
Filed May 30, 1942   2 Sheets-Sheet 1

INVENTOR.
Llewellyn T. Barnes,
BY
ATTORNEY.

March 26, 1946.　　L. T. BARNES　　2,397,308
METHOD OF MAKING PISTON RINGS
Filed May 30, 1942　　2 Sheets-Sheet 2
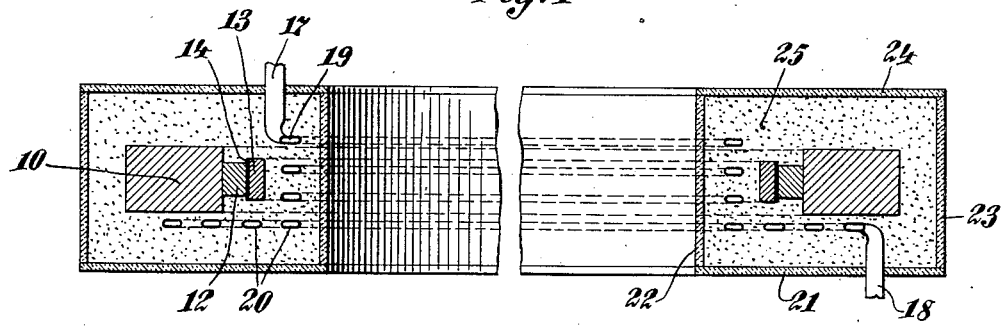
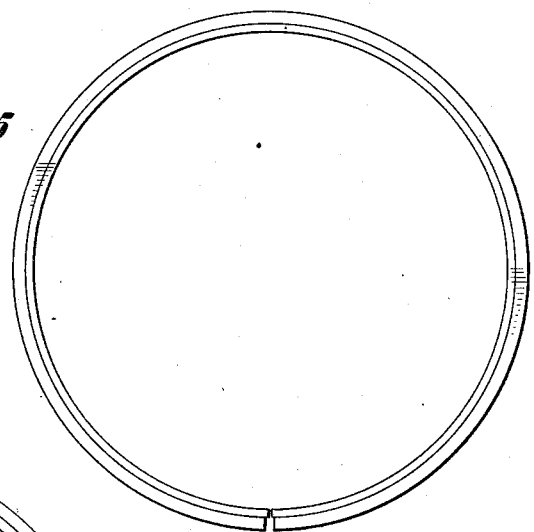
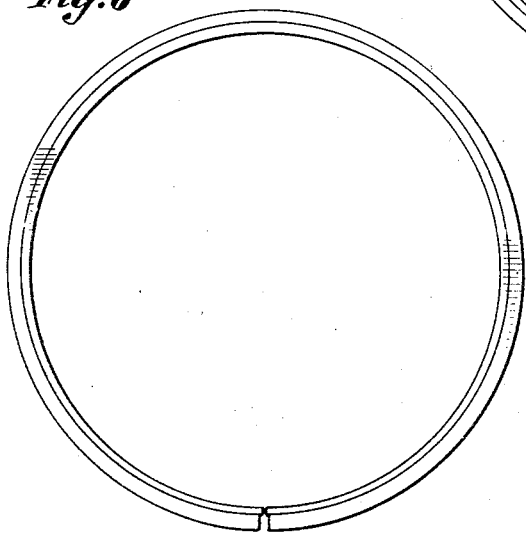
INVENTOR.
Llewellyn T. Barnes,
BY
ATTORNEY.

Patented Mar. 26, 1946

2,397,308

UNITED STATES PATENT OFFICE 2,397,308

METHOD OF MAKING PISTON RINGS

Llewellyn T. Barnes, Hempstead, N. Y., assignor to Bi-Metal Piston Ring Corporation, New York, N. Y., a corporation of New York Application May 30, 1942, Serial No. 445,237

14 Claims. (Cl. 29—156.6)

This invention relates to the manufacture of piston rings, and accomplishes substantial improvements in bi-metal piston rings and in the production thereof by bonding the metals in an integrated unit by a simple and economical method.

The substance of the invention is illustrated by referenec to one practicable form of apparatus in the use of which the method may be practiced to produce one example of the product.

In the drawings, Fig. 1 is a plan view of a jig with an assembly therein of the constituent parts, before bonding, of a bi-metal piston ring;

Fig. 4 is a sectional view showing, on the line 4—4 of Fig. 1, the jig and assembled parts, associated with a high frequency induction element and a muffler employed in the bonding operation;

Fig. 5 is a plan view of a piston ring which is the immediate product of the bonding operation indicated in Fig. 4; and Fig. 6 is a product which may be made by a further step applied to the ring of Fig. 5.

The principles of the invention will be explained as related to the manufacture of a piston ring which is intended to have a finished outside diameter of 8". Appropriate specific dimensions will be given to indicate how this manufacture may proceed. It is to be understood, of course, that these dimensions are merely exemplary and are subject to wide variation as will be readily understood by those skilled in the art.

Figure 1:
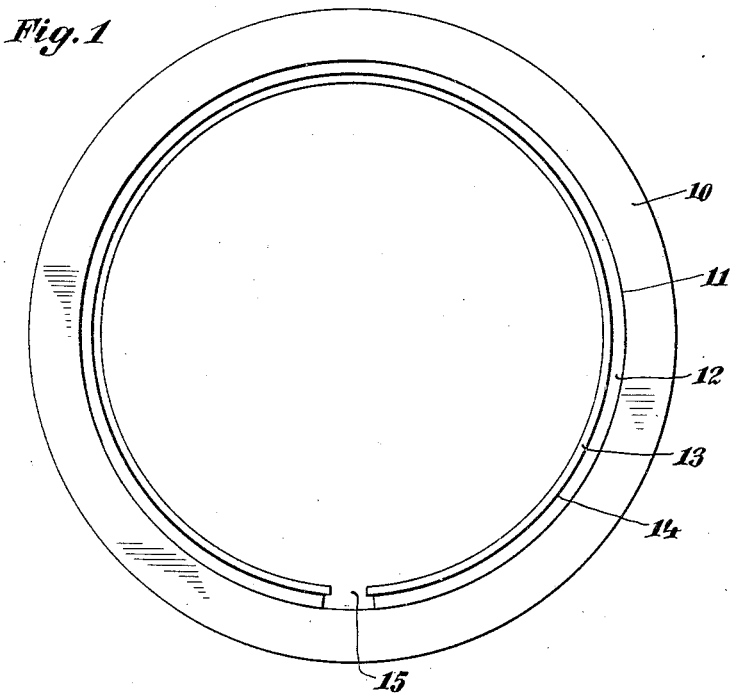

In the drawings, the jig 10 is a cast iron ring of approximately rectangular cross section. Its inner wall 11 is not truly cylindrical. Its transverse or horizontal diameter in Fig. 1 is 8.4375, and its vertical diameter is 8.5625. The intervening quadrants are curved progressively from one diameter to the other. In use, the described jig rests upon a smooth table to receive the assembly of parts next described. The non-circular shape of the jig is so designed that the split ring (presently described) which has been conformed to that shape will approach true circularity, as it is flexed toward closure of its gap.

The illustrative piston ring to be produced is intended to comprise an outer split ring 12 of cast iron, an inner split ring 13 of steel and an interposed thin ribbon 14 of silver. The ring 12 is of cast high-phosphorus iron to supply the outer face of the ring with superior wearing qualities. One practicable formula for this cast iron is as follows:

| | |
|---|---|
| Combined carbon | 0.60–0.80 |
| Graphitic carbon | 2.90–3.20 |
| Manganese | 0.50–0.80 |
| Phosphorus | 0.30–0.60 |
| Sulphur | 0.08 Max. |
| Silicon | 2.20–2.70 |

This iron should have a Rockwell "B" hardness of from 85 to 95. This iron ring may be cast in true circularity and made to conform to the non-circular shape of the jig in the further operation of the method; or the ring may be cast so that its initial shape will conform to the jig. The ring has a gap 15. The outer face of the ring is .255" wide and its radial thickness is .180". The gap 15 may be about .750" wide.

Inside the iron 12 is the ring 13 of spring steel preferably containing carbon about 0.70 to 0.80 and having a Rockwell "B" hardness of about 90 to 95. The face of the ring may be .3125 inch wide and the radial thickness .125 inch. The cross section may be roughly rectangular with rounded corners as illustrated in Fig. 4. The steel rings may be formed from rod stock by winding the rods spirally around a mandrel of suitable diameter and then severing the rod to form the separate rings to fit closely inside the iron rings 12, and to leave a gap approximately .400 inch wide between the ends of the ring. When the rings 12 and 13 are assembled in the jig 10, their respective gaps register, and the adjacent ends of the inner steel ring project slightly beyond the corresponding ends of the cast iron ring.

At some stage in the assembly operation, a silver ribbon 14 is introduced to be interposed between the cast iron ring 12 and the steel ring 13. The ribbon may be from .003 to .005 inch thick and about .300 inch wide.

The preliminary preparation of the metal rings, including the silver, is important. A preferred treatment comprises degreasing all three parts in a bath containing carbon tetrachloride or some other form of grease solvent. After washing and soaking in the bath, a test for degreasing, by dilute sulphuric acid, may be applied. When thoroughly degreased the metals may be sandblasted enough to roughen slightly their surfaces that are to be bonded; then brushed to remove the loose frosting resulting from the sandblasting. Then they may be desirably covered with a flux paste to protect them from oxidation. Such a paste may be based upon dehydrated borax or the like, and may be brushed on the surfaces to be bonded. When thus protected the parts may be kept in stock in closely closed containers. If any considerable time elapses between the application of this flux and the bonding operation, it is advantageous to brush off the flux and to make a fresh application of it so that it may be still damp in the form of a film on the surfaces to be bonded when the parts are assembled in the jig.

Figure 3:
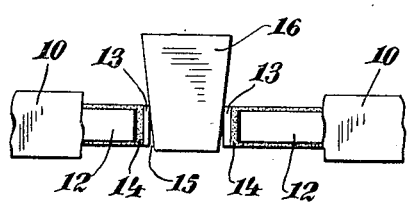
Fig. 3 is a side elevation of the wedge of Fig. 2.
Figure 2:
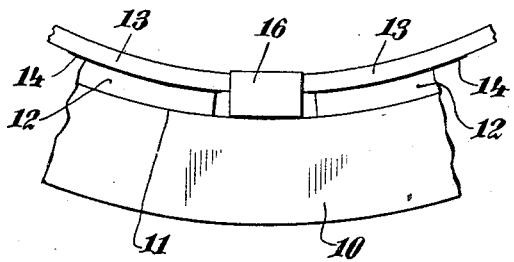
Fig. 2 is an enlarged view of the lower portion of Fig. 1 showing the jig and an inserted wedge the operation of which exemplifies the step of placing the constituent parts under compression.

A feasible sequence in the assembly is to rest the jig 10 upon a clean glass plate, to insert the cast iron ring 12 and then the steel ring which has been so shaped that it may be contracted radially and then released when the silver ribbon has been interposed, to provide sufficient pressure to hold the parts in assembled relationships. When so assembled as shown in Fig. 1 it is important to exert on the parts a strong pressure radially to hold their contacting surfaces closely together. One practicable way to produce that pressure is illustrated in Figs. 2 and 3 by the solid wedge 16 the outer surface of which may rest against the inner wall of the jig 10 while the wedge walls are interposed in the gap between the end faces of the steel ring 13, which faces converge to facilitate the wedging action. The ends of the iron ring 12 are spaced somewhat from the wedge. As the wedge is forced downwardly it tends to spread apart the ends of the steel ring, and it exerts a strong force comprising radial components, throughout the periphery of the steel ring, which place all the assembled parts under heavy compression against the rigid encircling wall of the jig 10. Besides holding the parts under compression, the wedge action or its equivalent causes all the parts to conform to the non-circular shape of the jig and to maintain them jointly in that shape preparatory to the bonding operation.

When the parts are in this condition, heat is applied, preferably focused primarily on the steel ring 13, at sufficient temperature to fuse the silver ribbon and unite it and the iron and steel rings in an efficient and continuous bond. In the specific examples of materials described, the coefficient of linear expansion of the steel ring 13 exceeds that of the cast iron ring 12; and the expansive tendency of the heated steel ring acting upon the fused silver squeezes out any excess of silver between the two rings while leaving enough to effectuate the bond. In successful demonstrations of the invention it has been found that the initial pressure of the steel ring caused by the wedging or its functional equivalent, and the expansive tendency of the heated steel ring, have combined radial components compressing the parts to the extent of about 300 pounds per square inch which contributes considerably to the perfection of the bond.

The heating and bonding operation may be performed successfully by the use of high frequency induction according to the arrangement illustrated in Fig. 4. A series of induction coils, for example of copper tubing containing water, has leads 17 and 18 connected with a conventional induction apparatus, and they are so arranged as to concentrate high frequency eddy currents primarily on the steel ring 13. This may be accomplished by disposing the coils in the angular series indicated in Fig. 4, some of them being arranged vertically inside the steel ring as at 19 and others in a horizontal series beneath the steel ring as at 20.

The preferred composition of the silver ribbon is that of an alloy having a melting point of about 1325 F. When that is employed, the maximum temperature at the peak of the heat may be from about 1400 to 1500 degrees F. Depending upon the particular character of materials used and their dimensions, the heating process may continue for a few seconds up to two or three minutes.

When the wedge 16 is employed it is desirable that it be made of a material of low electrical resistance, such as beryllium copper alloy, of relatively higher conductivity than the assembly of piston ring parts. This tends to compensate for the resistance offered at the points of contact of the steel ring and the wedge and to produce an average resistance across the gap in the steel ring fairly commensurate to the resistance of the ring itself.

It is important to protect against oxidation, before and during the bonding operation, the metal faces to be bonded together. One efficient form of protection during heating is supplied by a so-called "muffle" shown in Fig. 4. On an asbestos mat 21 rests an asbestos ring 22 spaced radially inward from the heating coils. Also resting on the mat 21 is an outer asbestos ring 23 which encircles the jig and assembled piston ring parts. Between the rings 22 and 23, the annular chamber which they provide may be filled with granulated charcoal 25 to cover the jig and parts during the heating operation. The top of the chamber may be closed by an asbestos cover 24.

The immediate product of the above-described method is shown in Fig. 5. Fig. 6 shows a product which may be made by the same method, starting with iron and steel rings of greater radial thicknesses than those indicated for the product of Fig. 5, and proceeding through a further step next described. The thicker iron and steel rings are bonded in accordance with the method already disclosed, and then the outer and inner faces of the integrated ring are machined eccentrically to produce, as shown in Fig. 6, progressively diminishing radial thicknesses of the inner steel ring complementing progressively increasing radial thicknesses of the outer iron ring, but eventually producing uniform radial thickness throughout the integrated ring. The purposes and effects of this procedure are disclosed in my co-pending application Serial No. 352,483, filed August 14, 1940, and are unnecessary to be elaborated here.

The specific details given in the foregoing description are merely illustrative of the broad inventive principles defined in the following claims. The sequence of steps in the method may be varied, and the respective steps may be performed with the aid of a variety of mechanical contrivances.

I claim as my invention:

1. A method of making bi-metal piston rings which is characterized by forming an outer split ring of high-phosphorus cast iron and an inner split ring of high carbon steel; degreasing, sandblasting and brushing the inner face of the iron ring and the outer face of the steel ring; forming a thin ribbon of silver alloy having a melting point of about 1325 F., and degreasing, sandblasting and brushing its faces; applying a flux to the silver ribbon and the inner and outer faces respectively of the iron and steel rings; assembling the steel ring inside the iron ring with the silver ribbon interposed between them; holding the assembled parts in non-circular shape with substantial gaps between the ends of the iron and steel rings, and in such shape that the rings will approach true circularity when they are flexed toward closing the gaps; applying heavy compression to said three parts in said non-circular shape, radially in respect to the peripheral contour of the assembly; heating the assembled parts by high frequency induction and concentrating high frequency eddy currents primarily on the steel ring to produce a peak temperature of about 1400 to 1500 degrees F., and thereby fusing the silver ribbon and brazing together the outer and inner rings, while radial compression on the parts extrudes part of the silver ribbon from between the two rings while retaining sufficient to perfect the bonding of the rings in an integrated unit, still in said non-circular form; and machining the outer and inner faces of the integrated ring eccentrically to produce progressively diminishing radial thickness of steel complementing progressively increasing radial thicknesses of the cast iron, while producing uniform radial thickness of the integrated ring.

2. A method of making bi-metal piston rings which is characterized by forming an outer split ring of high-phosphorus cast iron and an inner split ring of high carbon steel; forming a thin ribbon of silver alloy having a melting point of about 1325 F.; assembling the steel ring inside the iron ring with the silver ribbon interposed between them; holding the assembled parts in non-circular shape with substantial gaps between the ends of the iron and steel rings, and in such shape that the rings will approach true circularity when they are flexed toward closing the gaps; applying heavy compression to said three parts in said non-circular shape, radially in respect to the peripheral contour of the assembly; and heating the assembled parts by high frequency induciton and concentrating high frequency eddy currents primarily on the steel ring to produce a peak temperature sufficient to fuse the silver ribbon and bond the outer and inner rings together throughout their adjacent surfaces to form an integrated unitary split ring.

3. A method of making bi-metal piston rings which is characterized by assembling an outer split ring of high-phosphorus cast iron and an inner split ring of high carbon spring steel, with a thin ribbon of metal interposed between the rings; holding the assembled parts in non-circular shape with substantial gaps between the ends of the iron and steel rings, and in such shape that the rings will approach true circularity when they are flexed toward closing the gaps; applying heavy compression to said three parts in said non-circular shape, radially in respect to the peripheral contour of the assembly; heating the assembled parts by high frequency induction to produce a peak temperature sufficient to fuse the metal ribbon and bonding the inner and outer rings together throughout their adjacent surfaces to form an integrated unitary split ring while said radial compression on the parts extrudes part of the ribbon from between the two rings while retaining sufficient to perfect the bonding of the rings in an integrated unit, still in said non-circular form.

4. A method of making bi-metal piston rings which is characterized by assembling an outer split ring of cast iron and an inner split ring of spring steel; applying a flux to the inner and outer faces respectively of the iron and steel rings; holding the assembled parts in non-circular shape with substantial gaps between the ends of the iron and steel rings, and in such shape that the rings will approach true circularity when they are flexed toward closing the gaps; applying heavy compression to said three parts in said non-circular shape, radially in respect to the peripheral contour of the assembly; and heating the assembled parts by high frequency induction and concentrating high frequency eddy currents primarily on the steel ring to produce a peak temperature sufficient to bond the rings in an integrated unit still in said non-circular form.

5. A method of making bi-metal piston rings which is characterized by assembling an outer split ring of cast iron and an inner split ring of steel, with a thin ribbon of metal, having a melting point lower than that of either ring, interposed between said rings; holding the assembled parts in non-circular shape with substantial gaps between the ends of the iron and steel rings, and in such shape that the rings will approach true circularity when they are flexed toward closing the gaps; applying heavy compression to said three parts in said non-circular shape, radially in respect to the peripheral contour of the assembly; and heating the assembled parts by high frequency induction to produce a peak temperature sufficient to fuse the metal ribbon and perfact the bonding of the rings in an integrated unit, still in said non-circular form.

6. A method of making bi-metal piston rings which is characterized by assembling an outer split ring of cast iron and an inner split ring of steel; holding the assembled rings in non-circular shape with substantial gaps between their ends; and in such shape that the rings will approach true circularity when they are flexed toward closing the gaps; applying heavy compression to said three parts in said non-circular shape, radially in respect to the peripheral contour of the assembly; and heating the rings by high frequency induction and concentrating high frequency eddy currents primarily on the steel ring, at sufficient temperature to bond the rings together in an integrated unitary split ring.

7. A method of making bi-metal piston rings which is characterized by assembling an outer split metal ring, and an inner split metal ring of higher coefficient of linear expansion than that of the first ring; holding the assembled rings in non-circular shape with substantial gaps between the ends of the respective rings, and in such shape that the rings will approach true circularity when they are flexed toward closing the gaps; applying heavy compression to said three parts in said non-circular shape, radially in respect to the peripheral contour of the assembly; heating the assembled parts by high frequency induction to produce a peak temperature sufficient to bond the rings in an integrated unit, still in said non-circular form; and machining the outer and inner faces of the integrated ring eccentrically to produce progressively diminishing radial thicknesses of steel complementing progressively increasing radial thicknesses of the cast iron, while maintaining uniform radial thickness of the integrated ring.

8. A method of making bi-metal piston rings which is characterized by assembling an outer split metal ring and an inner split metal ring of higher coefficient of linear expansion than that of the first ring; holding the assembled rings in non-circular shape such that the rings will approach true circularity when they are flexed toward closing their gaps; applying heavy compression to said three parts in said non-circular shape, radially in respect to the peripheral contour of the assembly; and heating the assembled rings with substantial uniformity throughout their adjacent faces, at sufficient temperature to bond them together.

9. A method of making bi-metal piston rings which is characterized by assembling an outer split metal ring, and an inner split metal ring of higher coefficient of linear expansion than that of the first ring, with interposed metal having a lower melting point than that of either ring; holding the assembled rings and said interposed metal in non-circular shape such that the rings will approach true circularity when they are flexed toward closing their gaps; applying heavy compression to said three parts in said non-circular shape, radially in respect to the peripheral contour of the assembly; and heating them with substantial uniformity throughout their adjacent faces, at sufficient temperature to bond them together.

10. A method of making bi-metal piston rings which is characterized by assembling an outer split iron ring, and an inner split steel ring, with interposed metal having a lower melting point than that of either ring; holding the assembled rings in non-circular shape such that the rings will approach true circularity when they are flexed toward closing their gaps; and heating them with substantial uniformity throughout their adjacent faces, at sufficient temperature to bond them together.

11. A method of making bi-metal piston rings which is characterized by assembling an outer split metal ring, and an inner split metal ring, with interposed metal having a lower melting point than that of either ring; applying heavy compression to said three parts in said non-circular shape, radially in respect to the peripheral contour of the assembly; and heating them by heat applied with substantial uniformity throughout the adjacent faces of the rings at a temperature sufficient to fuse said metal and bond the rings together in an integrated unitary split ring.

12. A method of making bi-metal piston rings which is characterized by forming an outer ring-section of cast iron and an inner ring-section of steel, both of non-circular shape, of respective dimensions permitting the inner section to be nested within the outer; assembling the steel ring-section inside the cast iron ring-section; interposing a brazing metal between contiguous surfaces of the outer and inner sections; applying compression to the parts so assembled, radially in respect to the peripheral contour of the assembly, during the ensuing heating and brazing; and heating the assembled parts to a peak temperature sufficient to fuse the brazing metal and braze the ring-sections together in an integrated ring structure.

13. A method of making bi-metal piston rings which is characterized by forming an outer split ring-section of cast iron and an inner split ring-section of steel, of respective dimensions permitting the inner section to be nested within the outer; assembling the steel ring-section inside the cast iron ring-section; interposing a brazing metal between contiguous surfaces of the outer and inner sections; positioning and holding the assembled parts in non-circular shape with substantial gaps between the ends of the respective ring-sections, and in such shape that the sections will approach true circularity when they are flexed towards closing the gaps; applying compression to the parts so assembled and held, radially in respect to the peripheral contour of the assembly, to maintain them under compression and in non-circular form during the ensuing heating and brazing; and heating the assembled parts by high frequency induction having eddy currents focused primarily upon the inner ring-section and the brazing metal, to a peak temperature sufficient to fuse the brazing metal and braze the ring-sections together in non-circular shape in an integrated ring structure.

14. A method of making bi-metal piston rings which is characterized by forming an outer split ring-section of one kind of metal and an inner split ring-section of another metal having a higher coefficient of expansion than that of the outer-section metal, said sections having respective dimensions permitting the inner section to be nested within the outer; assembling the two ring-sections so nested; interposing brazing material between the outer and inner sections; and heating the assembled parts by high frequency induction, and focusing eddy currents thereof primarily upon the inner ring-section and brazing material, to a peak temperature sufficient to bond the ring-sections together in an integrated ring structure.

LLEWELLYN T. BARNES.